United States Patent
Prins

(10) Patent No.: US 6,226,355 B1
(45) Date of Patent: May 1, 2001

(54) X-RAY EXAMINATION APPARATUS INCLUDING AN X-RAY FILTER

(75) Inventor: Menno W. J. Prins, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/342,838

(22) Filed: Jun. 29, 1999

(30) Foreign Application Priority Data

Jul. 1, 1998 (EP) .................................................. 98202213

(51) Int. Cl.[7] .................................................. G21K 3/00
(52) U.S. Cl. ............................................ 378/158; 378/156
(58) Field of Search ...................................... 378/156, 158

(56) References Cited

U.S. PATENT DOCUMENTS

| | | | | |
|---|---|---|---|---|
| 4,741,012 | * | 4/1988 | Duinker et al. | 378/145 |
| 5,625,665 | | 4/1997 | Fokkink et al. | 378/156 |
| 5,666,396 | * | 9/1997 | Linders et al. | 378/156 |
| 5,751,786 | * | 5/1998 | Welters et al. | 378/156 |
| 5,768,340 | * | 6/1998 | Geittner et al. | 378/159 |
| 5,966,426 | * | 10/1999 | Marra et al. | 378/159 |
| 6,061,426 | * | 5/2000 | Linders et al. | 378/149 |
| 6,118,855 | * | 9/2000 | Welters et al. | 378/158 |

FOREIGN PATENT DOCUMENTS 8903110 7/1991 (NL) .................................. H05G/1/64

* cited by examiner

*Primary Examiner*—David V. Bruce
*Assistant Examiner*—Allen C. Ho

(57) ABSTRACT

The invention relates to an X-ray examination apparatus for forming X-ray images of an object. An X-ray examination apparatus of this kind includes an X-ray source, an X-ray filter for adjusting the two-dimensional distribution of an X-ray beam to be generated on the object and an X-ray detector. The X-ray filter includes capillary tubes whose inner sides are provided with an electrically conductive layer and one end of which communicates with a reservoir containing an X-ray absorbing liquid. For each capillary tube the quantity of X-ray-absorbing liquid can be adjusted by way of an electric voltage applied across the inner side of the capillary tube and the X-ray absorbing liquid. The X-ray filter is arranged between the object and the X-ray source, the tubes of the X-ray filter being arranged such that the tubes of the X-ray filter are arranged such that lines through all longitudinal axes of the tubes are intersecting lines extending through the X-ray source via the X-ray filter to the X-ray detector. In this way X-rays to be generated, starting from the X-ray source travelling via the X-ray filter to different points of the detector traverse a substantial part of the X-ray absorbing liquid in at least one of the capillary tubes.

9 Claims, 3 Drawing Sheets

X-RAY EXAMINATION APPARATUS INCLUDING AN X-RAY FILTER

The invention relates to an X-ray examination apparatus for forming X-ray images of an object, including
an X-ray source for generating an X-ray beam,
an X-ray filter which includes tubes containing an X-ray-absorbing liquid, the quantity of X-ray-absorbing liquid in each of the tubes being adjustable in order to adjust the intensity profile on the object, and
an X-ray detector for detecting an X-ray image.

A device of this kind is known from Netherlands patent application No. 8903110. The X-ray filter in the known device is arranged in the X-ray beam between the X-ray source and the object in order to enable adjustment of a two-dimensional intensity distribution of the beam, the tubes then being directed approximately parallel to the X-ray beam. In order to adjust the two-dimensional intensity distribution, the tubes are completely or partly filled with the X-ray-absorbing liquid. An important property of such an X-ray filter is the ratio of an X-ray transmittance in a first state with a maximum filling to the X-ray transmittance in a second state with a minimum filling. This property is referred to as the dynamic range. For a large dynamic range the X-ray transmittance in the second state with a minimum filling must be as high as possible, for example 80%. Furthermore, the X-ray transmittance in the filled, first state must be as low as possible. In order to achieve a high X-ray transmittance, the tubes of the X-ray filter contain compounds of elements having a low atomic number, for example synthetic materials. In order to achieve a low transmittance, the tubes also contain a liquid having a high X-ray absorptivity. Furthermore, the surface area of the tube walls is not negligibly small relative to the entrance surface area of the tube openings. The entrance surface area of the tube openings amounts to, for example 90% of the total area of both the area of the tube wall and the entrance surface area together. It is a drawback of the known device that the dynamic range of the two-dimensional intensity distribution of the X-ray beam to be adjusted is limited.

It is an object of the invention to provide an X-ray examination apparatus in which the dynamic range of the two-dimensional intensity distribution to be adjusted for an X-ray beam to be generated is increased. To this end, an X-ray examination apparatus according to the invention is characterized in that it the tubes of the X-ray filter are arranged such that lines through all longitudinal axes of the tubes are intersecting lines extending through the X-ray source via the X-ray filter to the X-ray detector. Advantageous embodiments of an X-ray examination apparatus according to the invention are defined in the dependent claims. The invention also relates to an X-ray filter for use in such an X-ray examination apparatus. The invention is based on the recognition of the fact that, when the tubes of the X-ray filter are arranged approximately parallel to the lines extending through the X-ray source via the X-ray filter to the X-ray detector, leakage of the X-ray beam through the walls of the tubes occurs because some X-rays can pass the X-ray filter without travelling through the X-ray-absorbing liquid. Furthermore, the requirements to be satisfied by the walls of the tubes in the state of maximum filling and the state of minimum filling are contradictory for straight passage. In the first state the X-ray transmittance of the walls should be minimum whereas in the second state the X-ray transmittance of the walls should be maximum. Efficient X-ray absorption can be achieved by ensuring that X-rays to be generated extends through a substantial part of the X-ray-absorbing liquid of at least one tube.

A special embodiment of the X-ray examination apparatus according to the invention is characterized in that the tubes of the X-ray filter are oriented towards a center, a distance from the center to a first normal to an image plane of the X-ray detector through a midpoint of a focus of the X-ray source being at least equal to a focus radius of the focus. An X-ray filter which is known from the European patent application EP-A-740839 includes tubes which are oriented substantially parallel to the lines extending from the X-ray source through the X-ray filter towards the X-ray detector. By placing the center of the X-ray filter outside the focus of the X-ray source, X-rays coming from the midpoint of the focus will intersect the tubes at an angle so that overlap occurs in the projection of neighbouring tubes. Furthermore, by orienting the tubes towards the center it is achieved that the distance which X-rays travel through the absorbing liquid is substantially equal for X-rays starting from the X-rays source and travelling via the X-ray filter to different points of the X-ray detector. So, the uniformity of resolution of the X-ray filter is enhanced. In the context of the present application the term uniformity of resolution is to be understood to mean the degree of equality between a resolution in a central region of the X-ray image and the resolution near the edges of the X-ray image. By arranging the center of the X-ray filter adjacent the focus of the X-ray beam to be generated it is achieved that X rays starting from the X-ray source travelling to different points of the X-ray detector traverses a substantial part of the absorbing liquid of at least one tube of the X-ray filter so that efficient X-ray absorption is achieved.

A further embodiment of the X-ray examination apparatus according to the invention is characterized in that a first cross-section of the X-ray filter in a first direction comprises a first segment of a first circle having a first radius, and that a second cross-section of the X-ray filter comprises, in a second direction which is perpendicular to the first direction, a second segment of a second circle having a second radius. A practical X-ray filter will often have such a construction, because it is easy to manufacture such X-ray filters. Moreover, the first radius may be equal to the second radius, so that the tubes are oriented along normals to a spherical surface.

Another embodiment of the X-ray examination apparatus according to the invention is characterized in that said means include the X-ray filter whose tubes are arranged in parallel, an angle enclosed by a longitudinal direction of the tubes relative to a second normal to an image plane of the X-ray detector being dependent on a first distance from a center of the X-ray filter to a tube near an edge of the X-ray filter and on a second distance from the center to the X-ray source. It is thus achieved that X rays starting from the X-ray source travelling through the X-ray filter to different points of the X-ray detector traverses a substantial part of the absorbing liquid of at least one tube of the X-ray filter so that efficient X-ray absorption is achieved A further embodiment of the X-ray examination apparatus according to the invention is characterized in that the tubes are of capillary dimensions, each of the capillary tubes being provided with electrically conductive walls. The capillary dimensions of the tubes and the electrically conductive walls render the X-ray filter suitable for the transport of an X-ray-absorbing liquid in the capillary tubes on the basis of the so-called electro-wetting principle. X-ray filters operating according to the electro-wetting principle are known from the cited European patent application EP-A 740839.

A further embodiment of the X-ray examination apparatus according to the invention is characterized in that the X-ray examination apparatus includes a first plate and a second plate both plates are positioned transverse to the longitudinal axes of the tubes, between which plates the tubes are arranged, and that a means for connecting various channels to the first plate of the X-ray filter contains an adhesive. This step enables simple assembly of X-ray filters.

A further embodiment of the X-ray examination apparatus according to the invention is characterized in that the adhesive contains X-ray absorbing particles. This step prevents the appearance of an undesirable pattern in the X-ray image, which pattern is visible to the user and is due to the fact that the X-ray absorption of the adhesive is lower than that of the X-ray-absorbing liquid at a side of the tubes which communicates with the X-ray-absorbing liquid.

The invention also relates to an X-ray filter for use in an X-ray examination apparatus as disclosed in claim 2.

The above and other, more detailed aspects of the invention will be described in detail hereinafter, by way of example, with reference to the drawing. Therein:

Figure 1:
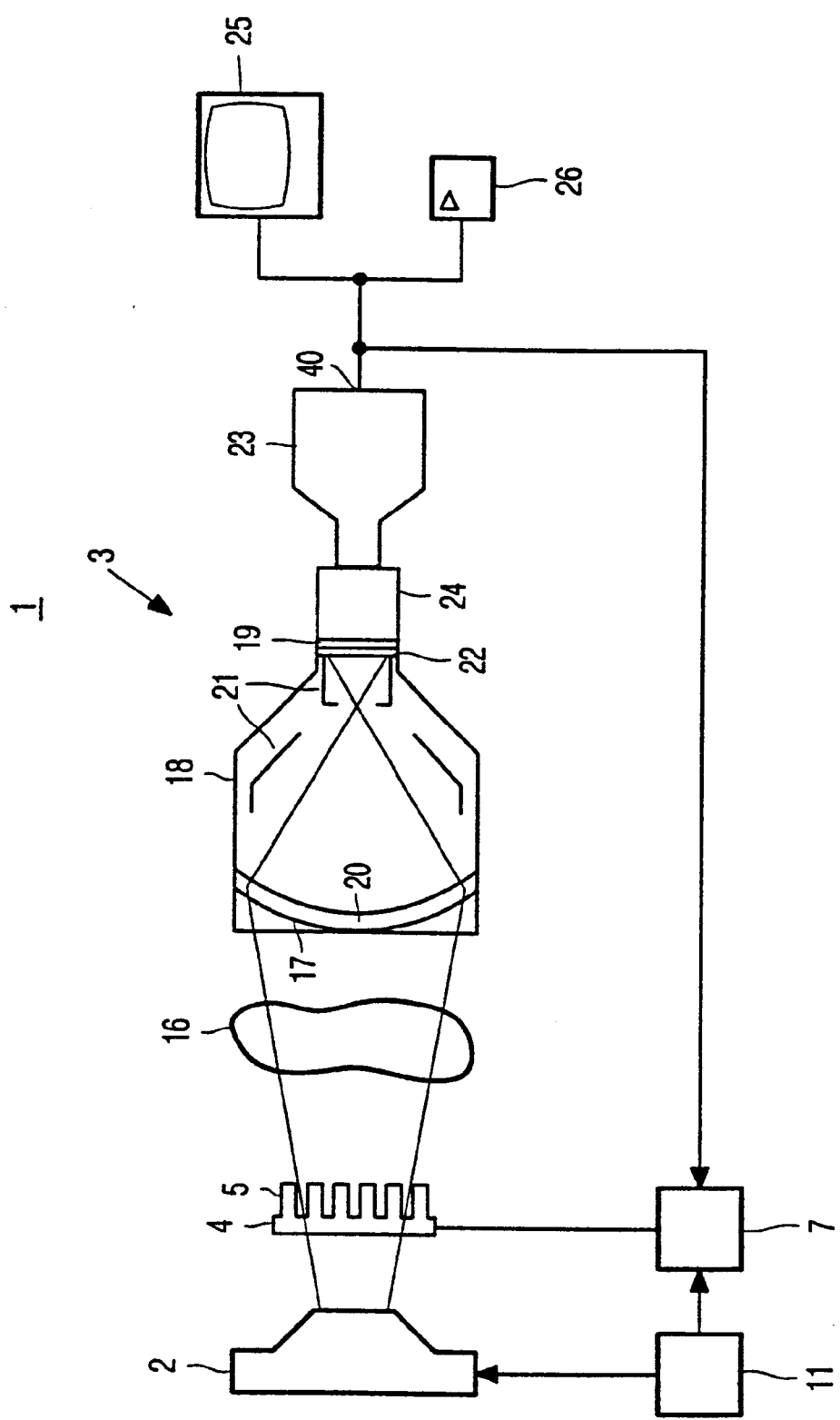
FIG. 1 shows an X-ray examination apparatus.
Figure 2:
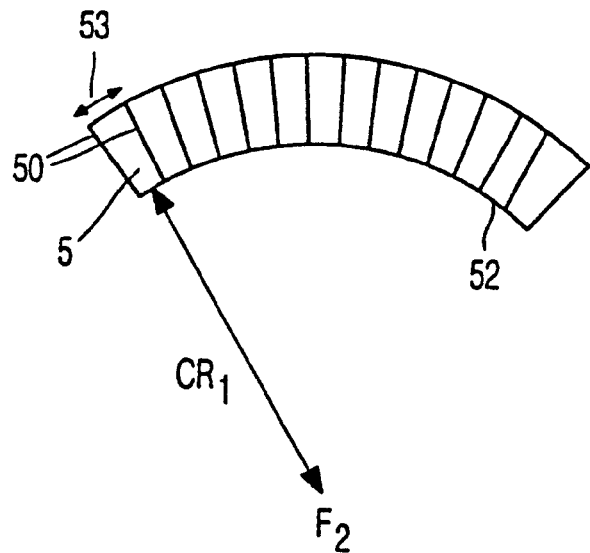
FIG. 2 is a sectional view of the first embodiment of the X-ray examination apparatus.

FIG. 1 shows an embodiment of an X-ray examination apparatus. The X-ray source 2 emits an X-ray beam 15 in order to irradiate an object 16. Due to differences in the X-ray absorption within the object 16, for example a patient to be radiologically examined, an X-ray image is formed on an X-ray-sensitive surface 17 of the X-ray detector 3 which is arranged so as to face the X-ray source. The X-ray detector is provided, for example with an image intensifier pick-up chain which includes an X-ray image intensifier 18 for converting an X-ray image into a light image on an exit window 19, and a video camera 23 for picking up the light image. An entrance screen 20 acts as an X-ray-sensitive surface which converts incident X-rays into an electron beam which is imaged onto an exit window 19 by means of an electron optical system 21. The incident electrons generate the light image by way of a phosphor layer 22 of the exit window. The video camera 23 is optically coupled to the X-ray image intensifier 18 by way of an optical coupling. The optical coupling includes, for example a lens system or an optical fiber coupling 24. The video camera derives an electronic image signal from the light image and applies it to a monitor 25 in order to visualize the image information of the X-ray image. The electronic image signal can also be applied, for example to an image processing unit 26 so as to be processed further. In order to realize local attenuation of the X-ray beam so as to adjust a two-dimensional intensity profile, an X-ray filter 4 is arranged in the X-ray beam 15 between the X-ray source 2 and the object 16. The X-ray filter includes a large number of filter elements 5. Furthermore, a filter element 5 preferably includes a capillary tube whose inner side is covered with an electrically conductive layer. The capillary tubes communicate, via a first opening, with a reservoir (not shown in the Figure) containing an X-ray absorbing liquid. The construction of such an X-ray filter and the composition of the X-ray-absorbing liquid are known from the cited European patent application EP-A-740839. The X-ray absorptivity of X-ray filters of this kind can be adjusted by application, using an adjusting unit 7, of electric voltages across the inner side of the capillary tubes 5 and the X-ray-absorbing liquid. This is because the adhesion of the X-ray-absorbing liquid to the inner side of the capillary tubes is dependent on the electric voltage applied across the inner side of the capillary tubes and the X-ray-absorbing liquid. The capillary tubes are filled with a given quantity of X-ray-absorbing liquid in dependence on the electric voltage across the individual tubes 5 and the X-ray-absorbing liquid. Because the capillary tubes extend approximately parallel to the lines from the X-ray source 2 via the X-ray filter 4 to the X-ray detector 3, the X-ray absorptivity of the individual capillary tubes is dependent on the relative amount of X-ray absorbing liquid present in such a capillary tube. The electric adjusting voltages for the individual filter elements are adjusted by means of the adjusting unit 7 while taking into account the brightness values in the X-ray image and/or the adjustment of the X-ray source 2. To this end, the adjusting unit 7 is coupled to an output terminal 40 of the video camera 23 and to the power supply 11 for the X-ray source 2. FIG. 2 is a sectional view of an X-ray filter in a first embodiment of the X-ray examination apparatus according to the invention. In FIG. 2 the cross-sections of capillary tubes 5 are oriented in a longitudinal direction towards a center $F_2$ of, for example a curved surface. A first cross-section 52 of the X-ray filter preferably comprises in a first direction a first segment of a first circle having a first radius $CR_1$ whereas a second cross-section of the X-ray filter comprises, in a second direction which is perpendicular to the first direction, a second segment of a second circle having a second radius $CR_2$. A spherical entrance surface of the X-ray filter 5 is obtained, for example when the first radius $CR_1$ is chosen so as to be equal to the second radius $CR_2$. For such a spherical surface the radii $CR_1$ and $CR_2$ amount to, for example 10 cm. The resolution uniformity of the X-ray filter 4 is enhanced by arranging the tubes 5 in the X-ray filter in this manner.

Furthermore, in practice the cross-sections 53 of the capillary tubes 5 amount to, for example approximately 300 $\mu$m and the wall thickness 50 of the capillary tubes amounts to, for example 10 $\mu$m. The number of capillary tubes 5 in the X-ray filter 4 amounts to, for example $256^2$, said number being arranged in a square matrix of 256×256 tubes. The positioning of the X-ray filter 4 in the first embodiment of the X-ray examination apparatus 1 according to the invention will be described with reference to FIG. 3.

Figure 3:
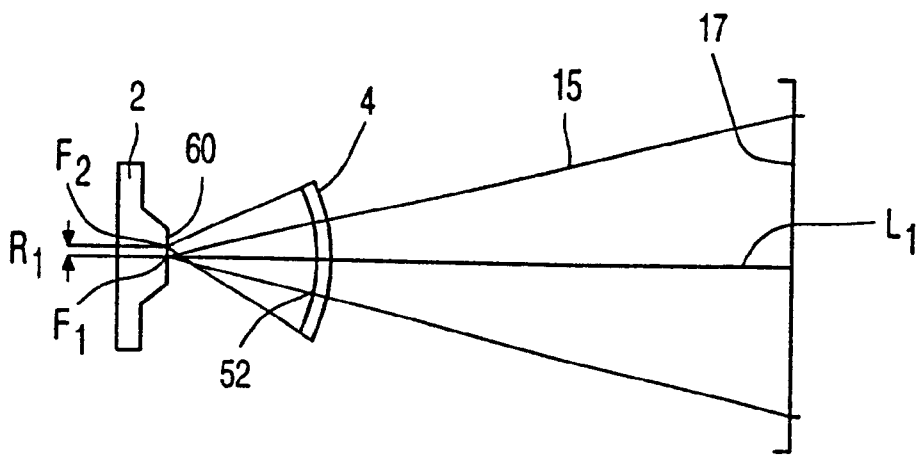
FIG. 3 shows a positioning of the X-ray filter of the first embodiment of the X-ray examination apparatus.

FIG. 3 shows an X-ray source 2 which has a focus with a first focus radius $R_1$ and a center $F_1$. FIG. 3 also shows an embodiment of an X-ray filter 4 whose tubes 5 are arranged on a spherical surface as shown, for example in FIG. 2. A center 60 of the X-ray filter, being coincident with a center of the spherical surface, a cross-section 52 of which is shown in FIG. 3, contains a center of the first circle as well as a center of the second circle. FIG. 3 also shows an X-ray sensitive surface 17 of the X-ray detector 18. In order to ensure that the lines trough all the longitudinal axes of the tubes intersects the lines from the X-ray source via the X-ray filter to different points of the X-ray detector, the distance from a first point $F_2$ of a center 60 of the spherical surface of the X-ray filter 5 to a midpoint $F_1$ of a focus of the X-ray source 2 is preferably chosen to be at least equal to a focus radius $R_1$ of the focus. In practice the focus radius $R_1$ amounts to, for example 150 $\mu$m and said distance thus amounts to, for example 150 $\mu$m. X rays starting from the X-ray source travelling to different points of the X-ray detector then traverses a substantial part of the absorbing liquid of at least one tube of the X-ray filter so that efficient X-ray absorption is achieved. The absorption efficiency in the X-ray-absorbing liquid is thus enhanced, and hence also the dynamic range of the X-ray filter. As a result of this step the theoretically feasible dynamic range is approached A cylindrically symmetrical surface can be used as an alternative for a spherical surface of the X-ray filter 5. The center 60 of the cylindrically symmetrical surface then contains a line.

Figure 4:
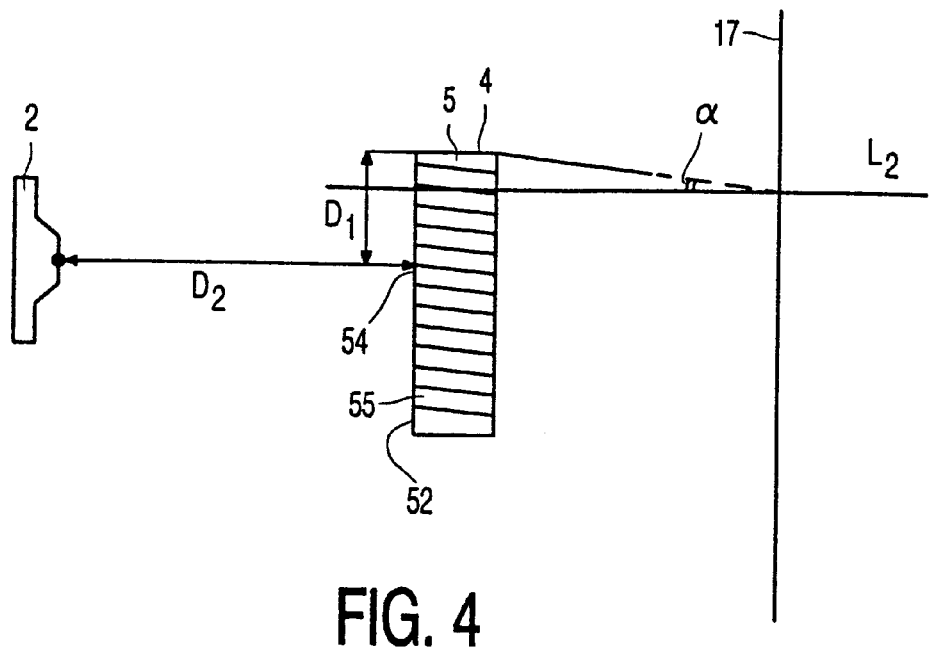
FIG. 4 shows a positioning of the X-ray filter of the second embodiment of the X-ray examination apparatus.

FIG. 4 shows an example of the positioning of the X-ray filter 4 in a second embodiment of the X-ray examination apparatus according to the invention. The second embodiment of the X-ray examination apparatus includes an X-ray source 2 with a focus having a first focus radius $R_1$ and a center $F_1$, an X-ray filter 4 in which the capillary tubes 5 are arranged so as to extend parallel to one another, and an X-ray detector 18. FIG. 4 also shows an X-ray-sensitive surface 17 of the X-ray detector 18. The X-ray filter 4 comprises, for example $256^2$ capillary tubes. The length of such capillary tubes 5 amounts to, for example 25 mm and their cross-section is, for example 200 μm. Furthermore, the entrance surface 54 of the X-ray filter extends parallel to the image plane of the X-ray-sensitive surface 17 of the X-ray detector 18. In order to enhance the dynamic range of the X-ray filter 5, an angle α enclosed by a longitudinal direction of a tube 5 of the X-ray filter 4 with respect to a second normal $l_2$ to the X-ray-sensitive surface 17 of the X-ray detector 18 is chosen to be equal to the arc tan of the ratio of a first distance $D_1$ between a center of an entrance surface 54 of an X-ray filter 4 and a tube 55 near an edge of the X-ray filter 5 to a second distance $D_2$ between the center of the entrance surface 54 and a center $F_1$ of the focus of the X-ray source 2. It is thus achieved that the lines trough all the longitudinal axes of the tubes intersects the lines from the X-ray source 2 via the X-ray filter 4 to different points of the X-ray detector 18 and that X rays starting from the X-ray source travelling to different points of the X-ray detector traverses a substantial part of the absorbing liquid of at least one tube of the X-ray filter so that efficient X-ray absorption is achieved. The distance $D_1$ in practice amounts to, for example approximately 25 mm whereas the distance $D_2$ amounts to approximately 100 mm. The angle α then amounts to approximately 14 degrees.

In order to prevent the appearance of an undesirable pattern in the X-ray image due to a difference in absorption between the X-ray absorbing liquid and the glued joints between various walls at the side of the capillary tubes which communicates with the X-ray absorbing liquid and a first plate of the X-ray filter, the adhesive contains X-ray absorbing particles. This step will be described in detail with reference to FIG. 5.

Figure 5:
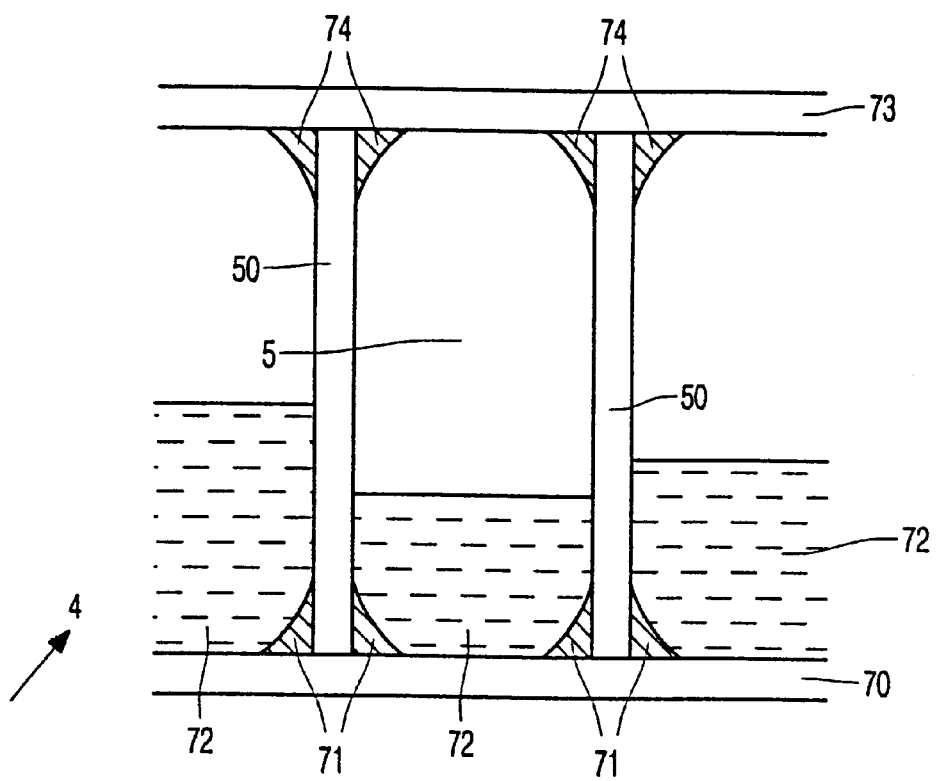
FIG. 5 shows a joint between a tube and a first plate of the X-ray filter.

FIG. 5 is a sectional view of an X-ray filter 4 which includes capillary tubes 5. The X-ray filter also includes a first plate 70 and a second plate 73, wherebetween the capillary tubes 5 are arranged. Preferably, the first and second plates 70,73 are positioned perpendicular to the capillary tubes 5. The tubes also have walls 50 which contain, for example a synthetic material. The tubes contain an X-ray-absorbing liquid 72. Different walls 50 of different tubes 5 are connected to the first plate 70 by way of a first glued joint 71 and to the second plate 73 of the X-ray filter by way of a second glued joint 74. The first and the second glued joint 71, 74 comprise an adhesive as customarily used by those skilled in the art, for example an epoxy-type adhesive or an adhesive of the two-component type. In order to prevent the adhesive in the first glued joint 71 between the walls 50 at the sides of the tubes which communicate with a reservoir containing the X-ray-absorbing liquid and the first plate 70 from causing an undesirable pattern in the X-ray image, an X-ray absorbing material, for example molybdenum (Mo), lead (Pb) or tungsten (W) is added to the adhesive of the first glued joints 71, so that the X-ray absorption of the glued joint approximately equals that of the X-ray absorbing liquid 72. An advantage of the use of molybdenum and tungsten over lead is that their effects on the environment are less severe.

What is claimed is:

1. An X-ray examination apparatus for forming X-ray images of an object, including an X-ray source for generating an X-ray beam, an X-ray filter which includes tubes containing an X-ray absorbing liquid, the quantity of X-ray absorbing liquid being adjustable in order to adjust an intensity profile on the object, and an X-ray detector for detecting an X-ray image of the object, characterized in that the tubes of the X-ray filter are arranged such that lines through all longitudinal axes of the tubes are intersecting lines extending through the X-ray source via the X-ray filter to the X-ray detector.

2. An X-ray examination apparatus as claimed in claim 1, in which the tubes of the X-ray filter are oriented towards a center, a distance from the center to a first normal to an image plane of the X-ray detector through a midpoint of a focus of the X-ray source being at least equal to a focus radius of the focus.

3. An X-ray examination apparatus as claimed in claim 2, in which a first cross-section of the X-ray filter in a first direction comprises a first segment of a first circle having a first radius and in which a second cross-section of the X-ray filter comprises, in a second direction which is perpendicular to the first direction, a second segment of a second circle having a second radius.

4. An X-ray examination apparatus as claimed in claim 1, in which the tubes of the X-ray filter are arranged in parallel, an angle enclosed by a longitudinal direction of a tube relative to a second normal to an image plane of the X-ray detector being dependent on a first distance from a center of the X-ray filter to a tube near an edge of the X-ray filter and on a second distance from the center to the X-ray source.

5. An X-ray examination apparatus as claimed in claim 1, in which the tubes are of capillary dimensions, the capillary tubes being provided with electrically conductive walls.

6. An X-ray examination apparatus as claimed in claim 1, in which the X-ray examination apparatus includes a first plate and a second plate, both plates being positioned transverse to the tubes, between which plates the tubes are arranged, and that a means for connecting various tubes to the first plate contains an adhesive.

7. An X-ray examination apparatus as claimed in claim 6, in which the adhesive contains X-ray absorbing particles.

8. An X-ray filter for use in an X-ray examination apparatus comprising:

a plurality of tubes containing an X-ray absorbing liquid, a quantity of the X-ray absorbing liquid being adjustable in order to adjust an intensity profile on an object, wherein the tubes of the X-ray filter are arranged such that lines through all longitudinal axes of the tubes are intersecting lines extending through an X-ray source via the X-ray filter to an X-ray detector of the X-ray examination apparatus.

9. An X-ray filter as claimed in claim 8, in which the tubes of the X-ray filter are oriented towards a center, a distance from the center to a first normal to an image plane of the X-ray detector through a midpoint of a focus of the X-ray source being at least equal to a focus radius of the focus.

* * * * *